United States Patent
Jeong (10) Patent No.: US 6,181,933 B1
(45) Date of Patent: Jan. 30, 2001

(54) MOBILE COMMUNICATION SYSTEM AND CONTROLLING METHOD THEREOF FOR PAGING AND ESTABLISHING DYNAMICALLY PAGING AREA

(75) Inventor: Yong-Tae Jeong, Taejon-si (KR)

(73) Assignee: Hyundai Electronics Ind. Co., Ltd., Kyoungki-do (KR)

(*) Notice: Under 35 U.S.C. 154(b), the term of this patent shall be extended for 0 days.

(21) Appl. No.: 09/187,633

(22) Filed: Nov. 6, 1998

(30) Foreign Application Priority Data

Dec. 5, 1997 (KR) .................................... 97-66448

(51) Int. Cl.[7] .................... H04Q 7/20; H04B 1/38
(52) U.S. Cl. .................. 455/432; 455/458; 455/560
(58) Field of Search .................... 455/432, 433, 455/434, 435, 458, 560

(56) References Cited

U.S. PATENT DOCUMENTS

| | | | |
|---|---|---|---|
| 5,390,234 | * 2/1995 | Bar-Noy et al. | 455/456 |
| 5,432,843 | * 7/1995 | Bonta | 455/438 |
| 5,463,672 | * 10/1995 | Kage | 455/458 |
| 5,548,816 | * 8/1996 | DeVaney | 455/456 |
| 5,561,840 | * 10/1996 | Alvesalo et al. | 455/433 |
| 5,613,212 | 3/1997 | Wong et al. | . |
| 5,691,982 | 11/1997 | Vuori et al. | . |
| 5,713,073 | * 1/1998 | Warsta | 455/524 |
| 5,736,934 | 4/1998 | Nozawa et al. | . |
| 5,777,560 | 7/1998 | Sukai et al. | . |
| 5,854,981 | * 12/1998 | Wallstedt et al. | 455/439 |
| 5,915,221 | * 6/1999 | Sawyer et al. | 455/437 |
| 5,937,413 | * 8/1999 | Hyun et al. | 707/201 |
| 5,953,667 | * 9/1999 | Kauppi | 455/440 |
| 6,058,308 | * 5/2000 | Kallin et al. | 455/432 |

* cited by examiner

Primary Examiner—Reinhard J. Eisenzopf
Assistant Examiner—Charles N. Appiah
(74) Attorney, Agent, or Firm—Reed Smith Shaw & McClay LLP (57) ABSTRACT

The invention relates to a mobile communication system and controlling method thereof for paging and establishing dynamically paging area, which is capable of making paging area dynamically according to position of a receiving mobile station. When a set-up signal is received, the NTP uses identifier of a BTS obtained from the location registration of the mobile station as a key for accessing paging database and accesses paging database by using the key. It makes near cell list using identifier of the BTS of the receiving MS, generates a paging list by extracting BTSs controlled by the same BSC from the near cell list and sends the paging list to each corresponding BTS. The percentage of paging success increases and the time of call connection reduce by establishing a paging area dynamically according to location of the receiving MS and paging in the dynamical paging area.

2 Claims, 9 Drawing Sheets

MOBILE COMMUNICATION SYSTEM AND CONTROLLING METHOD THEREOF FOR PAGING AND ESTABLISHING DYNAMICALLY PAGING AREA

BACKGROUND OF THE INVENTION

1. Field of the Invention

The present invention relates to a paging of mobile station and, more particularly, to a mobile communication system and controlling method thereof for paging and establishing dynamically a paging area, which is capable of making a paging area dynamically according to the position of a receiving mobile station.

2. Discussion of Related Art

A mobile communication system generally provides communication services for a mobile station (MS). While the mobile station is moving, the mobile station registers its own the location in the home location register (HLR) at regular time intervals. When a mobile switching center receives a request for a call from an other mobile station or telephone subscriber to the mobile station, it reads the location registration information of the mobile station from the HLR and pages the mobile station according to the location information. When it receives a paging response from the mobile station, the mobile switching center performs a procedure for connecting the call. The present invention applies to a paging mobile station through a paging channel.

Figure 1:
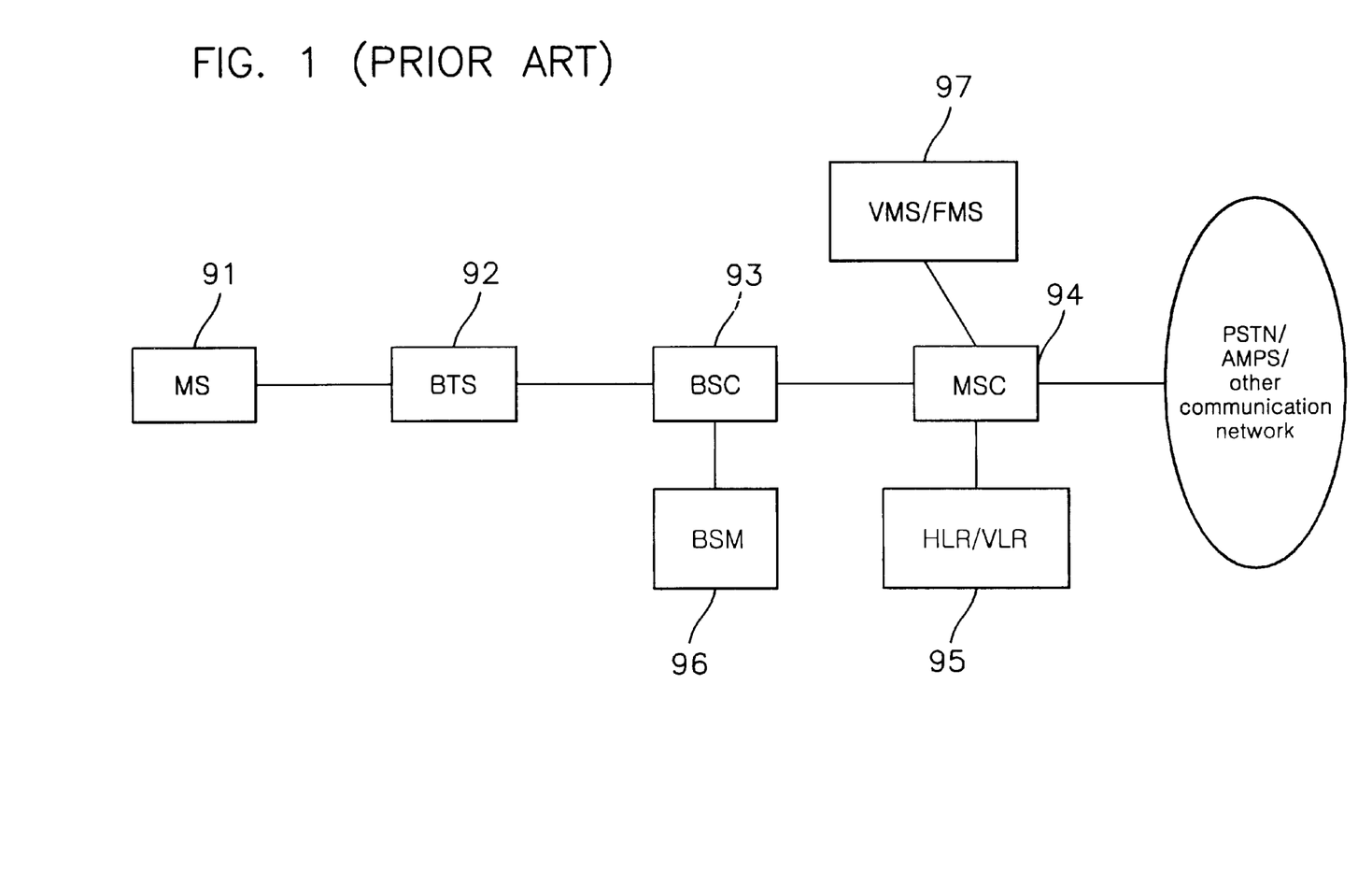
FIG. 1 shows a block diagram of a general CDMA mobile communication system.

FIG. 1 shows a block diagram providing the construction of a Code Division Multiple Access mobile communication system.

The CDMA system comprises a mobile station 91 operating while moving or stationary at an unspecified position; a base transceiver station 92 receiving a request for a call processing of the MS 91 and sending a request for a call transmitting from a base station controller 93 to the MS 91; a base station controller 93 controlling a signal processing between the BTS 92 and the mobile switching center 94; a base station manager 96 managing the BSC 93; a mobile switching center 94 sending a request for call processing of the MS 91 according to the control of the MSC 94 to the Public Switching Telephone Network, Advanced Mobile Phone Service or other communication network and providing personal communication service; a home location register/visitor location register 95 connected to the MSC 94 and storing the location information of the mobile station subscribing for the MSC 94 and mobile station entering into the area where the MSC 94 services; a voice mail system/fax mail system VMS/FMS 97 connected with the MSC 94, storing up voice and facsimile information and performing voice and facsimile services by switching then.

The following description is about the operation of call connecting between a sending mobile station and a receiving mobile station in the Code Division Multiple Access mobile communication system. When the MSC 94 receives a set-up signal which requests establishing a call from a subscriber of CDMA mobile communication network or an other communication network, it sends a paging control signal to a corresponding BTS in order to page a mobile station. As it receives a response to the paging signal from the paged mobile station, it connects the call between the attempting subscriber and the receiving mobile station to provide a telephone call service.

Figure 2:
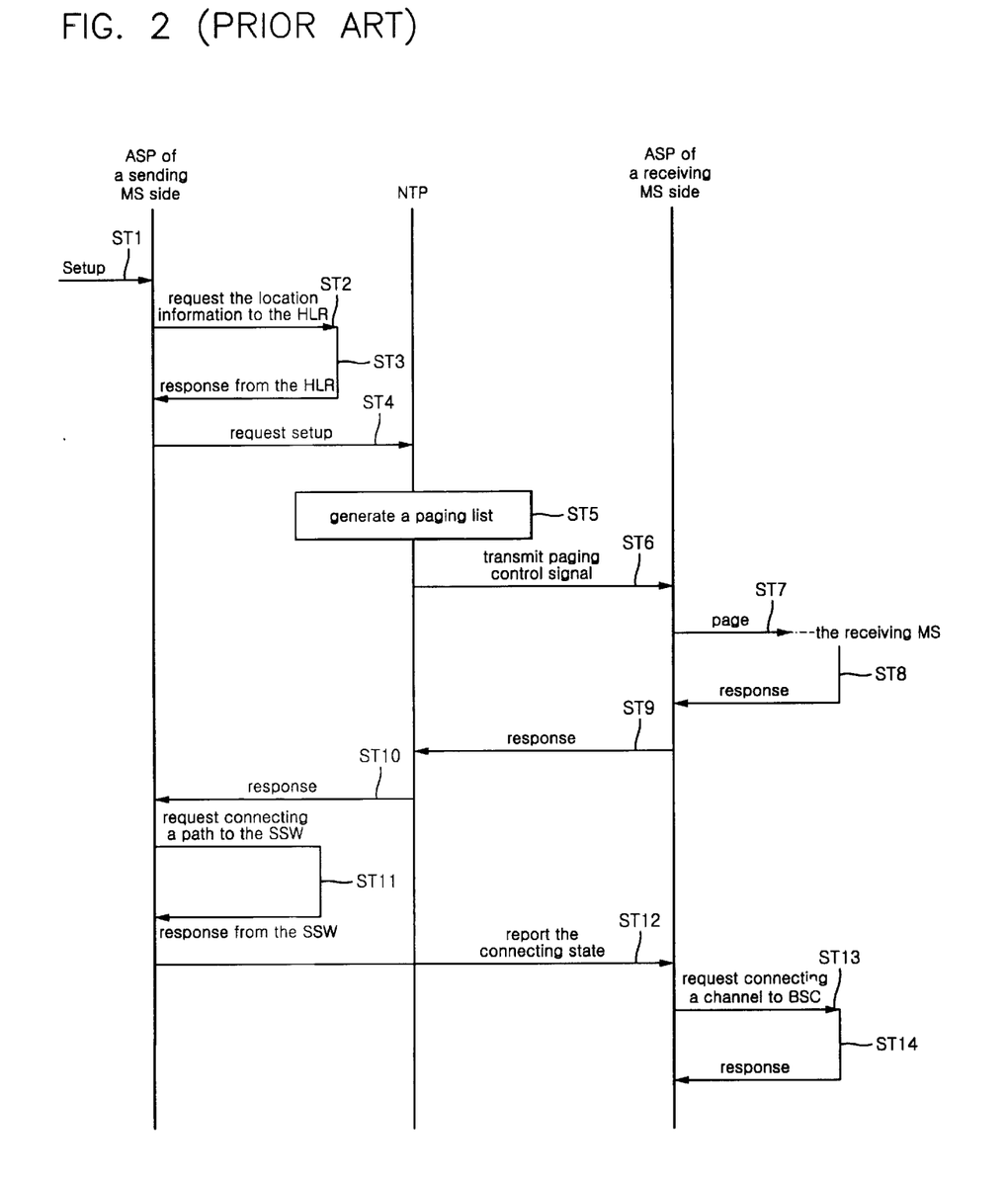
FIG. 2 represents a flow chart showing call connections through paging when a all set up is requested.

FIG. 2 shows an operating flow for establishing a call between a sending mobile station and a receiving mobile station through a paging process. As shown in the drawing, the process of a call connection between the sending MS(Mobile Station) and the receiving MS includes the steps of: first process ST1–ST3 representing that an access subsystem processor ASP to which the sending MS belongs requests the location registration information of the receiving MS to the home location register HLR when a mobile switching center receives a set-up signal from the sending MS and obtains the location registration; second process ST4–ST6 representing that a number translation processor NTP creates a paging list in accordance with the already established paging area and sends a paging signal to the ASP connected with the BSC included in the paging list when the NTP receives the set-up signal; third process ST7–ST10 representing that the NTP sends the response for the set-up signal to the ASP of the sending MS side, when the response signal for paging from the receiving MS is sent after a BTS in the paging list pages the receiving MS; forth process ST11 and ST12 representing that the ASP of the sending MS side connects a path between the sending MS and the MSC by a space switch and reports the connecting state to the ASP of the receiving MS side; fifth process ST13 and ST14 representing that the ASP of the receiving MS side connects a channel between the MSC and the receiving MS.

The operation of connecting a channel between the sending MS and the receiving MS is described below.

The sending MS sends a set-up signal to a BSC through a BTS, the BSC transmits the set-up signal to Access Switching Subsystem-Mobile connected to itself (ST1). The ASP controlling the ASS-M requests a location registration information for the receiving MS to the home location register through a link control channel (ST2). The LCC reads the location registration information for the receiving MS from the HLR and sends the information to the ASP (ST3). The location registration information comprises the identifiers of the location area identity LAI, MSC, BSC and BTS, including the receiving MS.

When the ASP receives the location registration information for the receiving MS from the LCC, the ASP of the sending MS side sends the information to the NTP and requests a destination call (ST4). The NTP creates a paging list using the location registration information for the receiving MS and transmits the paging control signal to the ASP connected to the BSC in the paging list (ST5–ST6).

The ASP transmits the paging control signal to the BSC connected to itself through the ASS-M, and the BSC transmits the paging control signal to the BTS included in the paging list of a plurality of BTSs controlled by the BSC (ST7). The BTS receiving the paging control signal sends the paging signal to a mobile station in its service area. As a result of the transmission, if a response for paging is sent from the receiving MS, the BTS transmits the paging response to the ASP through the BSC (ST8). The ASP sends the paging response to the NTP, and then the NTP sends the response to the ASP of the sending MS side (ST9, ST10).

The ASP of the sending MS side allocates resources related to a telephone call and makes a channel between the sending MS and MSC. It reports the connection state to the ASP of the receiving MS (ST11, ST12). On this, the ASP of the receiving MS side requests the BSC of the receiving MS side to connect a channel between MSC and the receiving MS. So the channel between the sending MS and the receiving MS is made. As a result that the channel is made, MSC provides mobile communication service to both the sending MS and the receiving MS.

Figure 3:
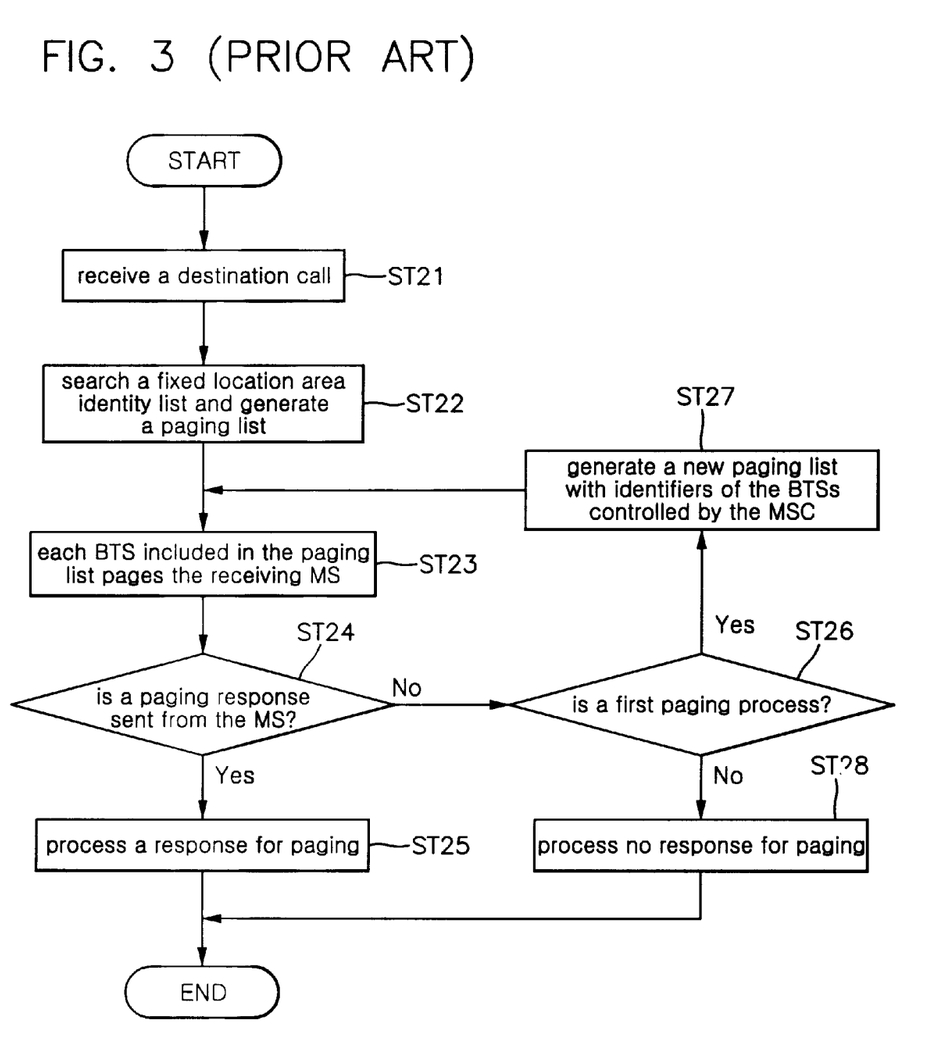
FIG. 3 is a flowchart showing a conventional paging method in a mobile communication system.

FIG. 3 shows a conventional method for paging the receiving MS in process that a channel is established between the sending MS and the receiving MS.

As shown in the drawing, the conventional method for paging comprises the steps of: steps ST 21 and ST 22 searching a fixed location area identity list and generating a paging list, in receiving a destination call from the ASP of the sending MS side; steps ST 23–ST 25 transmitting a paging control signal to a BTS included in the paging list and processing a response for paging when a paging response is sent from the receiving MS; steps ST 26 and ST 27 transmitting, if the paging response is not sent from the receiving MS, the paging control signal to each BTS controlled by the MSC having the location registration information of the receiving MS and controlling each BTS to page the receiving MS; step ST 28 processing the response for paging if the paging response is sent from the receiving MS and processing no response for paging if the response for paging from the receiving MS is not sent, as the result that each BTS pages the receiving MS.

The LAI is set statically by a system manager in consideration of the topographical effect, each LAI can include many BTSs and the whole area of mobile communication service is divided into many LAIs.

Figure 4:
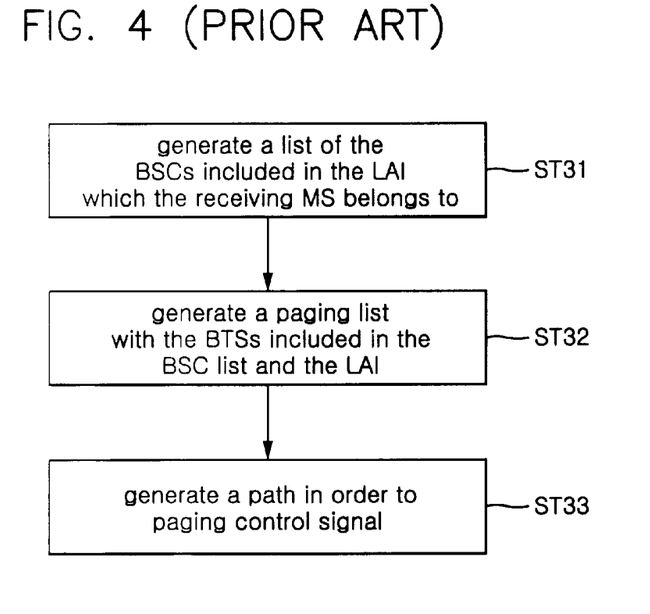
FIG. 4 indicates a method for generating a paging list by a conventional paging method.

As shown in FIG. 4, the paging list creating steps of ST21 and ST22 includes the sub-steps of: step ST 31 searching a LAI including the receiving MS out of location registration information obtained from HLR and generating a BSC list included in the LAI ; step ST 32 finding BTSs controlled by respective BSCs comprised of the BSC list and creating a paging list with only BTSs included in the LAI out of the BTSs; step ST33 obtaining identifier of ASS-M interfaced with each BSC included in the BSC list and creating a IPC path to send a paging control signal.

A conventional paging method for a mobile communication system will be explained below.

The smallest unit of a paging area is the BTS in a mobile communication ystem, each BTS is included in each location area identity (LAI). The LAI is a logical paging area in order to page a mobile station MS and becomes the same paging area in consideration of topographical effect. The system manager statically allocates many BTSs included in the same paging area logically for one LAI. If a position of the MS is registered to one of many BTSs allocated for the LAI, only the BTSs allocated for the LAI page the MS. When a BTS is adjacent to the BTS to which the MS belongs, if the adjacent BTS is not allocated in the LAI, the adjacent BTS does not perform the paging process. Hence LAI is a static paging area.

When a set-up signal is transmitted from a BSC of the sending MS side to the ASS-M, an ASP controlling the ASS-M reads the location registration information of the receiving MS from the HLR and transmits a request of setting up to the NTP. The NTP generates a paging list by using the identifier of the LAI from the location registration information as a key.

Figure 10A:
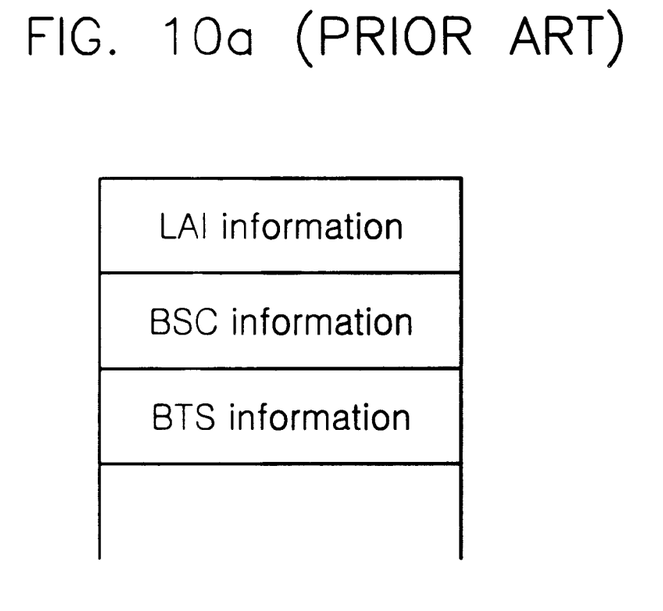
FIG. 10a shows the construction of a paging database applied to a conventional paging method.

As shown in FIG. 10a, in order to generate paging list using LAI, the NTP has a paging database that stores information of the LAI, BSC and BTS. A LAI information area has all LAIs and identifiers of BSCs which correspond to each LAI. A BSC information area has information of the BSC, identifier of the ASS-M interfaced with each BSC and the number of BTSs controlled by each BSC. A BTS information area has information of the BTS, identifier of the BSC controlling each BTS and identifier of the LAI including each BTS.

When the set-up signal is transmitted from the ASP of the sending MS side, The NTP accesses the paging database. At this time the NTP uses the identifier of the LAI out of the location registration information for the receiving MS as a key. And then the NTP obtains identifiers of BSCs included in the LAI and generates a BSC list with he identifiers of the BSCs (ST31).

Figure 5:
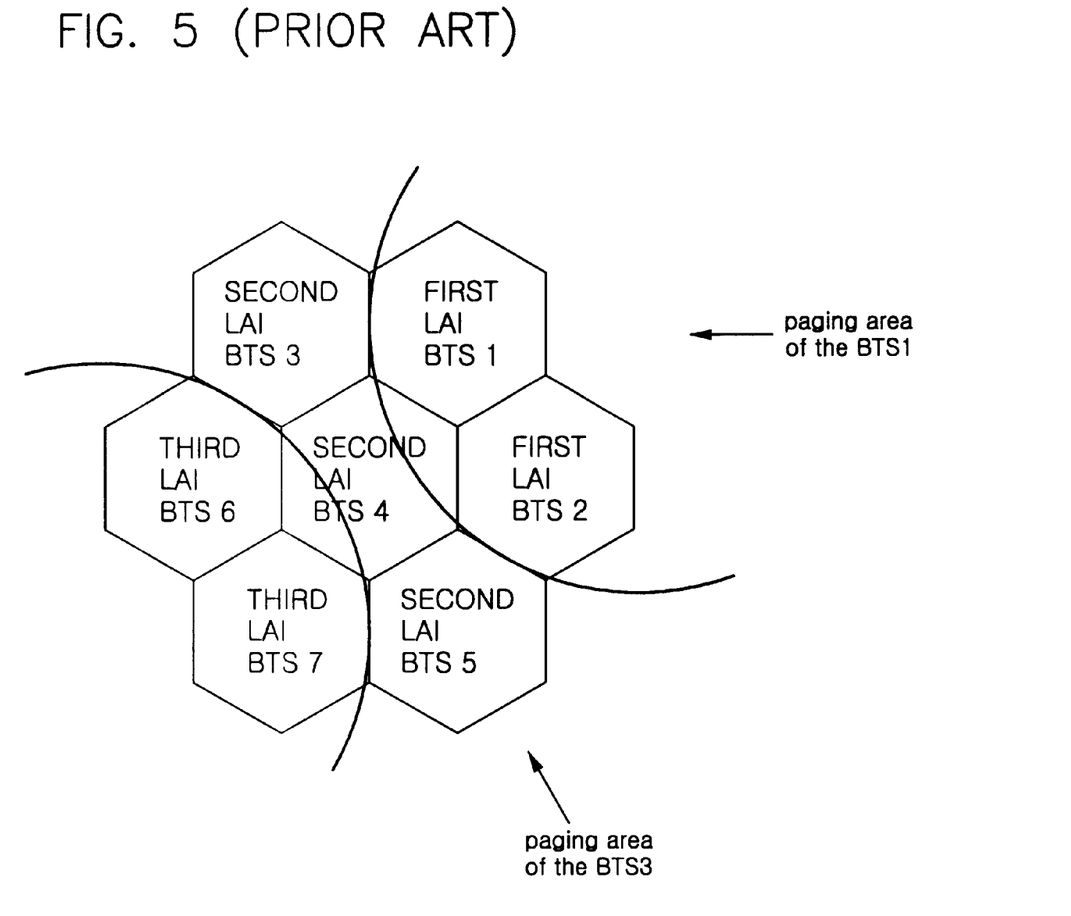
FIG. 5 shows a conventional paging area.

Here is an explanation about the LAI that exists in a MSC. As depicted in FIG. 5, a plurality of BTSs are allocated in each LAI. If the receiving MS is included in the cell of BTS 1 belonging to the first LAI, a key to access a LAI information area is set with the identifier of the first LAI. The NTP accesses the LAI information area of the paging database using the key. If the first LAI includes BSC 1, the NTP obtains the identifier of the BSC 1 with the key and generates the BSC list by employing the identifier of the BSC 1 (ST31).

A key to access a BSC information area is set with the identifier of the BSC included in the BSC list. The NTP accesses the BSC information area and obtains identifiers of BTSs controlled by the BSC as the key. The BTS included in the first LAI out of the BTSs controlled by the BSC becomes BTS 1 and BTS 2. The NTP generates a paging list using identifiers of the BTS 1 and the BTS 2 (ST32).

After such a paging list is (generated, the NTP accesses the BSC information area using an identifier of the BSC included in the BSC list and obtains the identifier of the ASS-M corresponding to the BSC included in the BSC list. Hence the IPC is established in this way. The NTP transmits a paging control signal to the BTSs which belongs to the LAI through the IPC (ST33). Among the MS, BTS, BSC and MSC, through E1 line with 2.048 Mbps telephone call data are sent and received, signaling for a telephone call is performed in the IPC mode. Because paging is accomplished with the IPC mode, the IPC path for paging is established. The NTP sends therefore a paging signal to the ASS-M corresponding to the ASS-M identifier obtained above. This paging control signal includes the paging list that represents BTS 1 and BTS 2 page the receiving MS respectively.

The ASS-M receiving the paging signal transmits the paging signal to the BTS 1 and the BTS 2 through the BSC. The BSC 1 and the BTS 2 pages the receiving MS respectively (ST23). The LAI that becomes the logical paging area and is statically established is taken as the unit of paving. Only the BTS 1 and the BTS 2 included in the first LAI get to page the receiving MS.

As shown in FIG. 3, if the receiving MS sends a response signal for paging to the first BTS 1, the BTS 1 sends the paging response to the ASS-M of the MSC (ST24). When the paging response from the receiving MS is transmitted, the NTP sends the paging response signal to the ASS-M of the sending MS side.

In a general mobile communication system, the process for registering the location of the MS is performed at the power on/off of MS, at a distance from MS to BTS over a given distance, at originating of MS or at hand off. Also the process for registering the location of the MS is performed with an unit of a period set by the system manager.

In such a registration process, though the receiving MS moves from the BTS 1 included in the first LAI to the BTS 3 included in second LAI, if a new location of the MS is not yet registered in the HLR, the paging area becomes the first LAI as before.

The NTP sends only the BTS 1 and the BTS 2 included in the first LAI paging control signal, the receiving MS does not receive the paging signal by moving to BTS 3 included in second LAI. As a result, the receiving MS does not send a paging response. Consequently, because the logical paging area is already established statically, though BTSs are allocated in different L.AIs, it happens that the BTSs lie adjacent to one another. On this occasion, if the subscriber moves to LAI the adjacent to the current LAI, the percentage of failure for paging the subscriber increases.

When the first paging fails, the NTP generates a new paging list with identifiers of the BTSs controlled by each BSC in order to try a second paging process. And then the NTP sends a paging control signal to the BTSs via each BSC(ST26, ST27). Hence the BTSs received the paging control signal transmit the paging signal(ST23). As a result of the paging, if the NTP receives the paging response from the receiving MS, it performs the process for paging response (ST10–ST14). After the BTSs transmit the paging signal, if the paging response from the receiving MS is not transmitted, the NTP performs no response process for paging the receiving MS (ST28).

Because the paging process is performed in the fixed paging area unit LAI, when a BTS allocated to a LAI is adjacent to another LAI and moves to the other LAI, the new location of the BTS is not yet registered to the HLR. As the current paging area remains at the previous LAI, the moving BTS does not receive the paging signal in the other LAI. Therefore, the paging system in the fixed paging area unit has the problem in that the failure rate of first paging is high.

Further, because the failure rate of first paging is high, the conventional mobile communication system tries a second paging. Due to having to try the paging, it has the disadvantage that the time required in setting up a channel between the sending MS and the receiving MS increases and it becomes overloaded.

SUMMARY OF THE INVENTION

Accordingly, the present invention is directed to a mobile communication system and a paging method that substantially obviates one or more of the limitations and disadvantages of the related art.

An object of the present invention is to provide a mobile communication system and a controlling method thereof for paging in a dynamical paging area that increases the percentage of success for paging by paging the receiving mobile station in the paging area established dynamically according to its location.

To achieve the above objective, the NTP uses identifier of a BTS obtained from the location registration of the mobile station as a key for accessing paging database and accesses paging database by using tie key. And then it creates the list of cells adjacent to the BTS. It extracts BTSs controlled by the same BSC from the list and creates a paging list with the extracted BTSs. It sends the paging control signal to each BTS. As a result, a paging area is set dynamically according to BTSs adjacent to a receiving mobile station and paging is performed in it.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Such a paging method of the mobile communication system in accordance with the present invention is described below in more detail.

Figure 6:
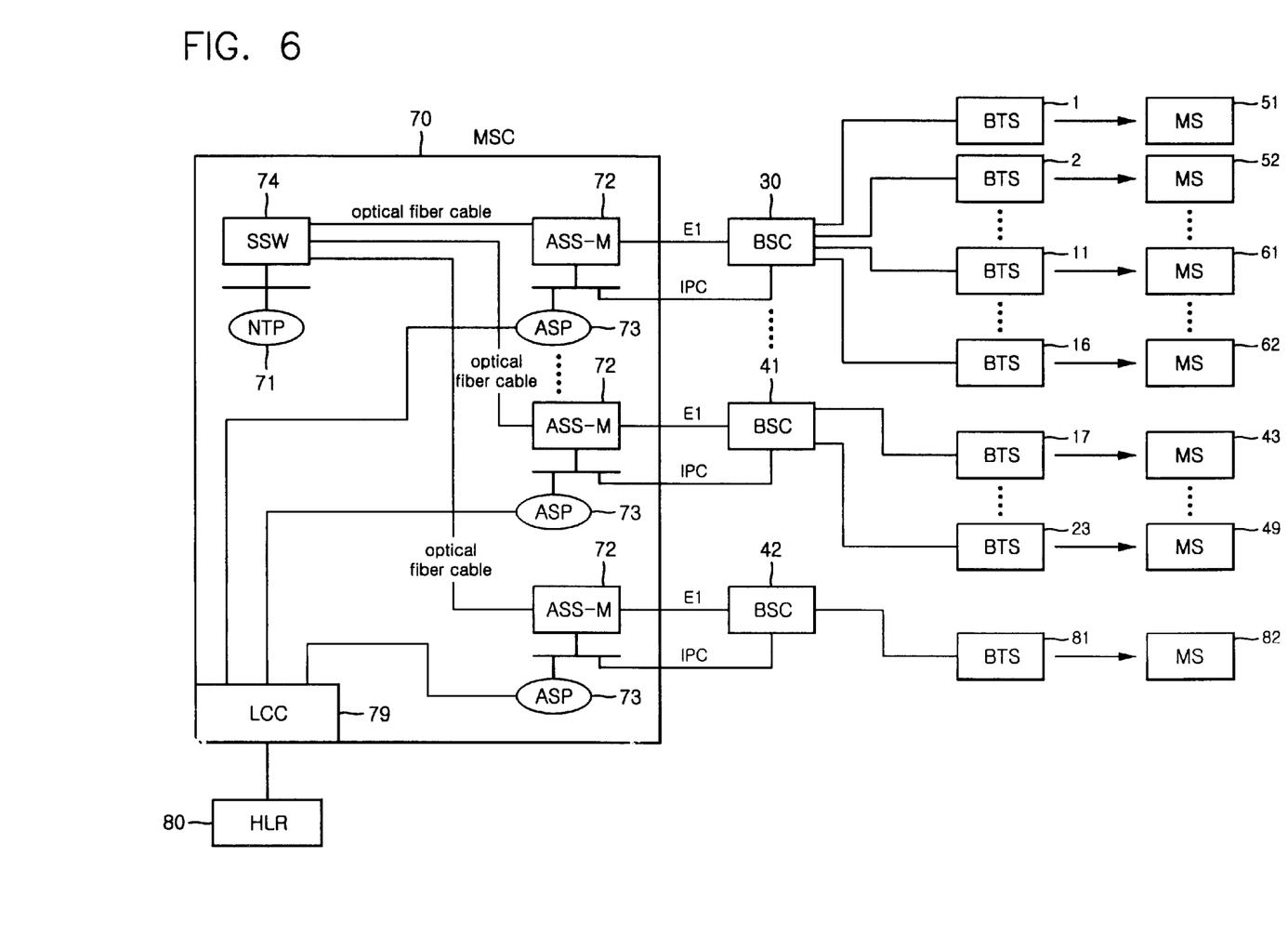
FIG. 6 shows a block diagram of the mobile communication system with the present invention.

FIG. 6 shows a block diagram of the mobile communication system with the present invention.

As shown in FIG. 6, the mobile communication system according to the present invention is comprised of a plurality of base transceiver stations 1–23 and 81 for receiving a set-up signal from a MS( Mobile Station) and sending a call signal to a receiving MS; a plurality of base station controllers 30–42 for controlling said BTSs 1–23 and 81; a mobile switching center 70 for dynamically setting a paging area according to the location of the MS registered at HLR in receiving a set-up signal from a particular one of the BSCs, for transmitting a BSC belonging to the paging area and for establishing a traffic path between a sending mobile station and a receiving mobile station in receiving a paging response from the sending mobile station after paging; a home location register 80 for managing location register information of each MS and providing the location information of a MS to MSC 70.

The MSC 70 is comprised of a number translation processor 71 for controlling switching signals to a sending MS and signals to a receiving MS, dynamically setting a paging area according to the location of the receiving MS and controlling process transmitting paging signal to the BTS belonging to the set up paging area; access switching subsystem-mobiles 79 72, . . . , 72 for being connected to a plurality of the BSC 30–42 one to one and interfacing each BSC with the MSC 70; access subsystem processors 73, 73, . . . , 73 for controlling the corresponding ASS-M one to one connected therewith; a link control channel 79 for reading location register information in the HLR 80 on a request signal of a plurality of ASPs 73, 73, . . . , 73 and transmitting it to the corresponding ASP; a space switch 74 for switching calls among the ASPs 73, 73, . . . , 73.

The NTP (Number Translation Processor) 71, if it receives a set-up signal from the ASP of a sending MS, dynamically sets the paging area with BTS in location register information and BTS adjacent thereto, and transmits a paging signal to each BTS located in the dynamical paging area.

The MSC 70 can control twelve BSCs at its maximum. Each BSC can control sixteen BTSs at its maximum. Therefore BTSs which a MSC can control become 12*16=92 at its maximum. The MSC is comprised of ASS-M (Access Switching Subsystem- Mobile) in order to match with a BSC. Each ASS-M is connected to a BSC one to one. A traffic signal among the MS, BTS, BSC and MSC is transmitted via E1 line (2.048 Mbps) and the signaling is performed in the Inter Processor Communication mode. The paging signal for callings MS is performed in the mode.

Figure 7:
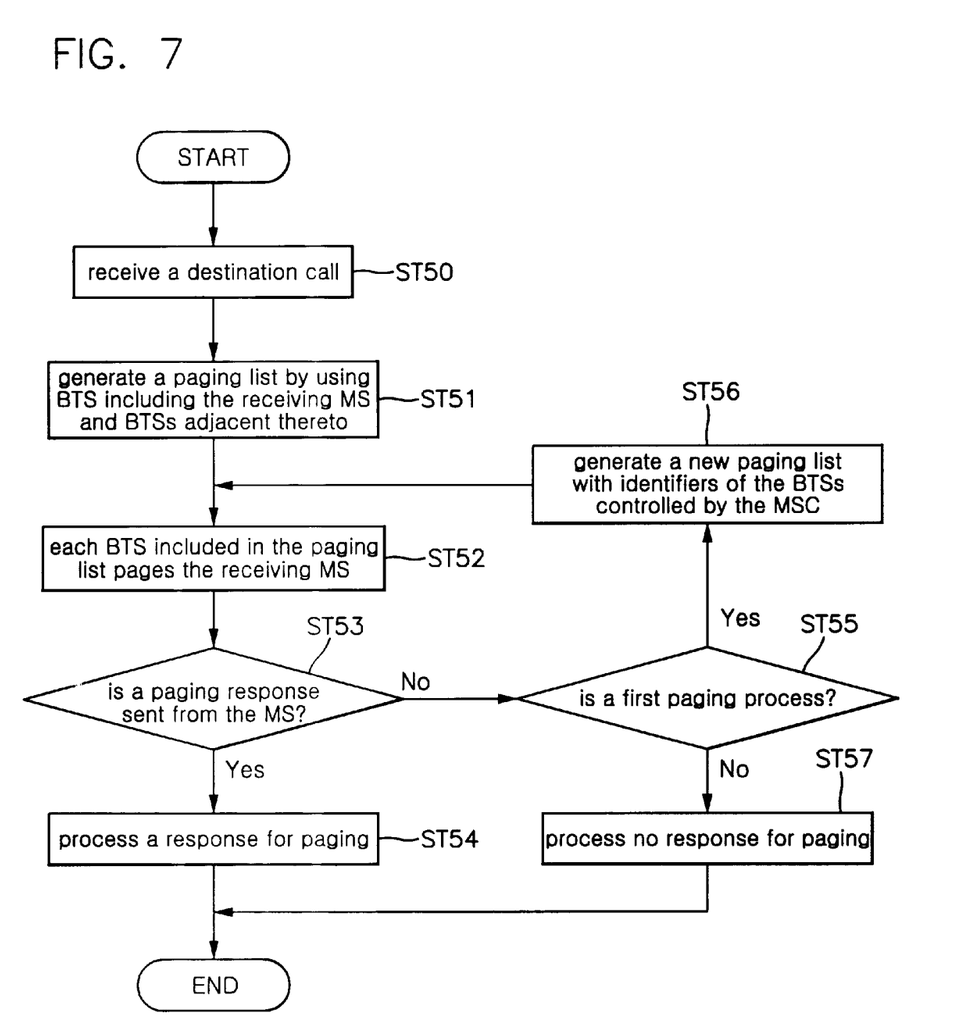
FIG. 7 is a flowchart showing a paging method in accordance with the present invention.

As shown in FIG. 2, paging is performed when a call is connected between a sending mobile station and a receiving mobile station. A paging method according to the present invention is shown in FIG. 7.

The method comprises a paging list creating process ST 50–ST51 for searching the contiguity cell list dynamically set with BTS, including the receiving MS and BTSs adjacent thereto when a set-up signal from the ASS-M of a sending mobile station is received by the NTP and creating, a paging list; a paging response processing process ST 52–ST 54 for sending a paging control signal to the BTS included in the list created in the paging list creating process to page a receiving MS and processing the paging response if the paging response from the receiving MS is sent; each BTS paging process ST 55–ST 56 for making each BTS to page its MS by a sending paging control signal to each BTS of which the receiving MS is registered in the paging area; a paging no response process ST 57 for performing a paging response process in receiving a paging response and a paging no response process in not receiving it.

Figure 8:
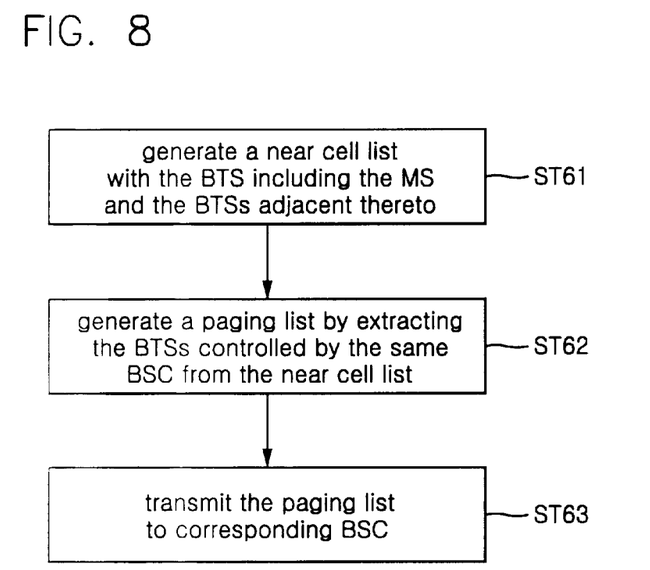
FIG. 8 indicates a method for generating a paging list according to the invention.

As shown in FIG. 8, the paging list creating process ST 50–ST51 comprises step ST61 for searching for BTS including a receiving MS in its location registration information obtained from HLR and creating a near cell list referring to the BTSs and the BTSs adjacent to it; step ST62 for creating a paging list by extracting BTSs controlled by the same BSC from the near cell list; step ST63 for transmitting the paging list to the corresponding BSC.

When a set-up signal hrcnii a sending mobile station MS 82 is sent to mobile switching center MSC 70, the access subsystem processor ASP 73 receiving the set-up signal requests a location registration information of a receiving mobile station 51 to home location register HLR 80. In that case, it sends to the ASP 73 the location registration information, namely, identifiers of MSC, BSC and BTS. The ASP 73 transmits a requests for a location registration information of a receiving mobile station 51 to the number translation processor NTP 71.

The NTP 71 sets the identifier of BTS as a key accessing paging database in the location registration information of the receiving MS 51 and accesses paging database with the key.

Figure 10B:
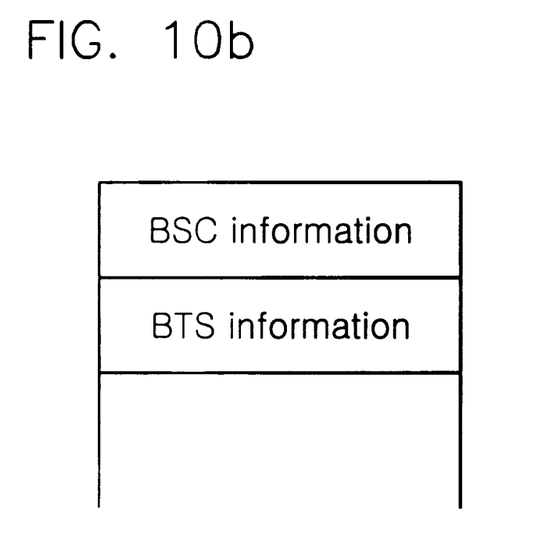
FIG. 10b indicates the construction of the paging database applied to the present invention.

As shown in FIG. 10b, the NTP 71 has a paging database in its memory which saves information of BSC and BTS. The BSC information area has the same information that the BSC information area of the conventional paging database has. Namely, the BSC information area has a identifier of the BSC controlled by the MSC, identifier of the ASS-M interfaced with each BSC and the number of BTS that each BSC controls. A BTS information area has an identifier of the BSC controlling BTS and the near BTS identifier list contiguous to each BTS. The near BTS identifier list is a logical paging area and is made by the system manager. When the frequency of the mobile communication service is high and the moving range of MS is wide in a zone, the near BTSs as well as the peripheral BTSs are included in the near BTS identifier list by the system manager.

Figure 9:
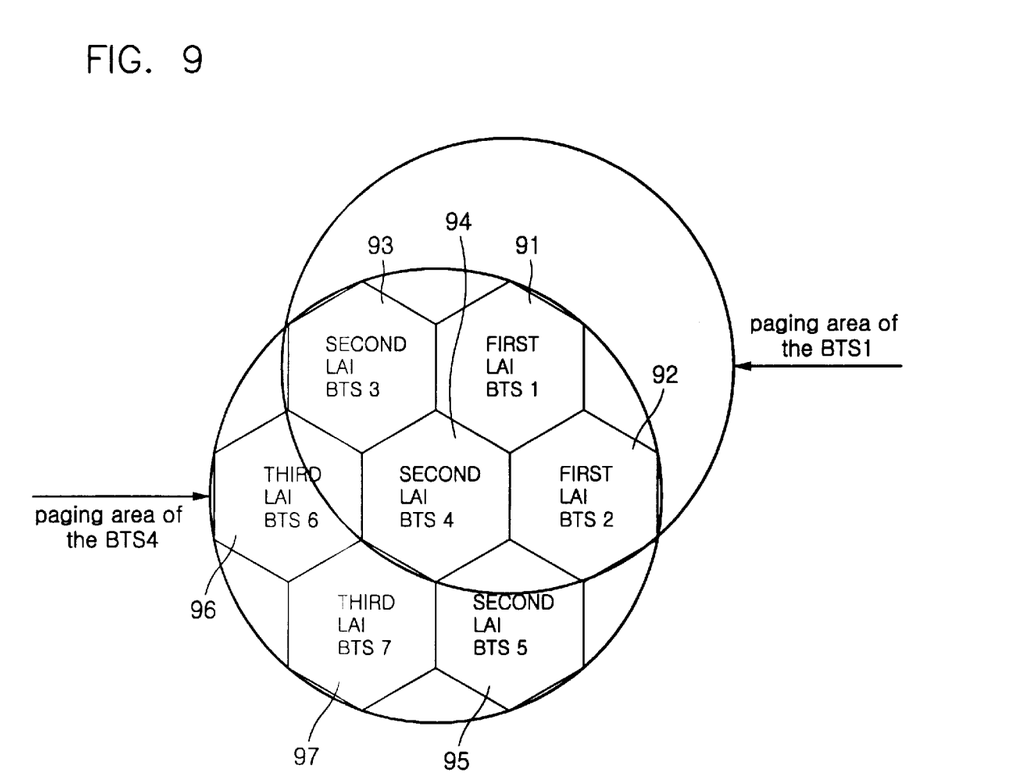
FIG. 9 depicts the paging area generated by the invention.

Referring to FIG. 9, it BTS 1 is the BTS serving the receiving MS, the near BTS identifier list of the BTS 1 comprises identifiers of BTS 1, BTS 2, BTS 3 and BTS 4 and the paging area becomes cells 91–94 which BTS 1 to BTS 4 serve. If BTS 2 is the BTS serving the receiving MS, the tracing area becomes cells 91,92, 94, 95. If BTS 4 is serving, the paging area becomes cells 91–97.

As described above, NTP 71 sets the identifier of a base transceiver station BTS as a key accessing paging database and accesses the paging database using the key. Because the receiving MS is located in the cell of BTS 1, identifier of BTS is that of BTS 1. As shown in FIG. 6, because all BTS 1 to BTS 4 are controlled by BSC 30, the NTP 71 makes a paging list with identifiers of BTS 1 to BTS 4. If BTSs included in the paging list are controlled by different BSCs, the NTP 71 divides the BTSs according to the path for paging and generates a paging list with the divided BTSs (ST61, ST62).

After the paging list is generated, the NTP 71 sends a paging control signal including the paging list to the corresponding ASP (ST63).

The ASP 73, which controls ASS-M 72 interfaced with BSC controlling the receiving MS 51, transmits the paging control signal to BSC 30. The BSC 30 sends the paging control signal to BTS 1 to BTS 4. The BTS 1 to BTS 4 simultaneously page the receiving MS 51, respectively (ST50–ST52).

Although the receiving MS 51 included in the cell of BTS 1 moves into the cell of BTS 3 adjacent to BTS 1 and the new location of the receiving MS 51 is not yet registered at HLR, the BTS 3 still belongs to the paging area of the receiving MS 51. So the BTS 3 performs paging to the receiving MS 51. As a result of paging, a paging response is sent from the receiving MS 51 to BSC 30.

In the conventional paging method, though the BTS 1 and the BTS 3 lie adjacent to each other, the BTS 1 and the BTS 3 are included in the different LAIs, respectively. Consequently, only the BTS 1 included in the first LAI performs paging and the BTS 3 not included in the First LAI does not perform paging. In consequence of paging, the first paging operation fails. So a second paging operation should be repeated.

As illustrated above, the present invention makes it possible to dynamically establish a paging area base on the BTS including MS and other BTSs adjacent to it and increases the percentage of paging success. The present invention is capable of decreasing the percentage of paging repeated and, because of the high percentage of paging success, decreasing the load of the system according to paging retry. Additionally, the present invention can reduce call connection time between the sending MS and the receiving MS.

It will be apparent to those skilled in the art that various modifications and variations can be made in the mobile paging method and mobile communication system of the present invention without deviating from the spirit or scope of the invention. Thus, it is intended that the present invention covers the modifications and variations of this invention provided they come within the scope of the appended claims and their equivalents.

What is claimed is:

1. A mobile communication system comprising: a mobile station MS; a plurality of base transceiver stations BTSs; a plurality of base station controllers BSCs; and a mobile switching center MSC including a number translation processor NTP transmitting paging control signal to each BTS included in a paging area, an access subsystem processor ASP controlling operation of a plurality of access switching subsystem-mobile ASS-M, a link control channel LCC and a space switch SSW switching a call, wherein the number translation processor NTP has a paging database for dynamically establishing the paging area, if it receives a set-up signal from the ASPs of a sending MS, accesses the paging database to the base transceiver station information in the location register information of the receiving MS, dynamically sets the paging area with the BTS and BTSs adjacent thereto and transmits a paging signal to at least two or more BTSs located in the dynamical paging area.

2. A mobile communication system of claim 1, wherein the paging database of the NTP comprises:

a base station controller information area having identifier of the BSC controlled by the MSC, identifier of ASS-M interfaced with each BSC and the number of BTS controlled by each BSC; and a BTS information area having identifier of BSC controlling BTS and a near identifier list of the BTSs contiguous to each BTS.

* * * * *